UNITED STATES PATENT OFFICE.

JULES STRAP, OF PARIS, FRANCE.

PROCESS OF TREATING COPPER AND NICKEL PYRITES.

SPECIFICATION forming part of Letters Patent No. 483,639, dated October 4, 1892.

Application filed June 8, 1892. Serial No. 435,977. (No specimens.)

*To all whom it may concern:*

Be it known that I, JULES STRAP, a citizen of the Republic of France, residing at Paris, France, have invented a new and useful Improvement in Processes of Treating Copper and Nickel Pyrites; and I do declare the following to be a full, clear, and exact specification.

My invention relates to an improved process of treating copper or nickel bearing pyrites whether mixed with iron or other metals, and while the process can be applied equally as well to the pyrites taken from the mine as to the mattes after subjection to the roasting process I will particularly refer to the treatment of mattes by my process, as in this form the metals are more susceptible to treatment.

I am aware that it is not new to subject the mattes to roasting at a low temperature, the resultant product of sulphates of copper and nickel or what has not been decomposed being dissolved by the action of diluted acid—that is, water containing about fifteen per cent. of acid.

My invention aims to avoid any decomposition of the sulphates of copper or nickel and to effect the dissolution without the use of acids. I first take the crushed or finely-divided matte and roast it, preferably by the oxidizing action of gas, taking care that the temperature does not exceed the degree at which the sulphate of copper is decomposed, (the sulphate of copper decomposing at a lower temperature than the sulphate of nickel.) At this temperature the sulphate of iron formed is decomposed, and thus may be separated from the rest of the material under treatment. The roasting process lasts about three or four hours and the temperature does not exceed 300° centigrade. I then subject the mineral to a second oxidizing roasting at a temperature not exceeding 600° centigrade, the temperature being constantly maintained in any suitable manner. At the end of eigtheen hours, the material having been successively agitated every hour, the iron is found changed to peroxide of iron ($Fe^2O^3$) and the copper and nickel to sulphates ($CuOSO^3$ and $NiOSO^3$.) Part of the copper is reduced to the state of a basic sulphate of copper, and this completes this part of the operation, there remaining no more sulphurets. The division of the process of roasting I find very advantageous, as it prevents agglomeration and secures the necessary oxidizing effect without exceeding the temperature stated. The matte thus treated is then subjected to an ordinary lixiviating treatment. The resultant solution contains in the state of sulphates all the copper and nickel. The solid residue is peroxide of iron utilized as purple ore. The mixture of the two sulphates is led into double-bottomed boxes, where it is treated with old iron pieces. Copper is deposited in the state of copper-cement and is replaced by an equal quantity of oxide of iron. The liquid is transferred into another basin and the copper-cement is gathered. The nickel and the iron are now to be separated. To make the sulphate of iron a peroxide, so that it may be precipitated by carbonate of calcium, cold air is blown into the liquor, and at the same time pulverized carbonate of calcium is added in small amounts and frequently, as this is necessary to have a complete reaction. The operation is completely terminated in five or six hours. Sulphate of calcium and peroxide of iron are formed, which are precipitated, and the resultant liquor contains sulphate of nickel only in a very pure state. This precipitate is quite spongy and the water which it retains is charged with sulphate. It must therefore be washed and the washing-waters be gathered.

To extract the metallic nickel, I use a bath of sulphate of nickel of 12° Baumé, adding thereto thirty per cent. of sulphate of ammonium. I then subject the bath to a current of electricity, using anodes of carbon and cathodes of thin nickel, with the result that the sulphate of nickel is decomposed and the metallic nickel deposited. The bath is constantly agitated, to which is added freshly-precipitated oxide of nickel. The sulphuric acid freed by the current with the oxide of nickel in suspension forms sulphate of nickel, which is again decomposed, and it is essential to constantly maintain the oxide of nickel in suspension.

I claim—

The hereinbefore-described process, consisting in crushing the mineral to proper size, roasting the crushed mineral in two operations at a temperature less than 600° centigrade, lixiviating the roasted material in acidulated water to dissolve the sulphates of copper and nickel, separating the sulphates, the copper by cementation and the nickel and iron by the precipitation of the latter, and subjecting the sulphate of nickel to treatment by electrolysis after first adding a proportion of sulphate of ammonium, substantially as described.

In witness whereof I have hereunto set my hand in presence of two witnesses.

JULES STRAP.

Witnesses:
 JULES FAYOLLET,
 DENIS P. KEOGH.